(12) United States Patent
Bockmeyer et al.

(10) Patent No.: US 10,590,036 B2
(45) Date of Patent: Mar. 17, 2020

(54) COMPOSITE MATERIAL WITH DECORATIVE COATING AND METHOD FOR PRODUCING SAME

(71) Applicant: SCHOTT AG, Mainz (DE)

(72) Inventors: Matthias Bockmeyer, Mainz (DE); Andrea Anton, Hueffelsheim (DE); Lutz Klippe, Wiesbaden (DE); Claudia Kottenstedte, Mainz (DE)

(73) Assignee: SCHOTT AG, Mainz (DE)

( * ) Notice: Subject to any disclaimer, the term of this patent is extended or adjusted under 35 U.S.C. 154(b) by 58 days.

(21) Appl. No.: 14/518,471

(22) Filed: Oct. 20, 2014

(65) Prior Publication Data

US 2015/0037507 A1    Feb. 5, 2015

Related U.S. Application Data

(63) Continuation of application No. PCT/EP2013/058218, filed on Apr. 19, 2013.

(30) Foreign Application Priority Data

Apr. 20, 2012  (DE) .................. 10 2012 103 507
Oct. 15, 2012  (DE) .................. 10 2012 109 808

(51) Int. Cl.
| | |
|---|---|
| *C03C 17/42* | (2006.01) |
| *B05D 7/00* | (2006.01) |
| *F24C 15/10* | (2006.01) |
| *B05D 1/36* | (2006.01) |
| *B05D 5/06* | (2006.01) |

(Continued)

(52) U.S. Cl.
CPC ............. *C03C 17/42* (2013.01); *B05D 1/36* (2013.01); *B05D 5/06* (2013.01); *B05D 7/52* (2013.01); *C03C 17/008* (2013.01); *C03C 17/32* (2013.01); *C03C 2217/425* (2013.01); *C03C 2217/485* (2013.01); *C03C 2217/72* (2013.01); *C03C 2218/36* (2013.01); *F24C 15/02* (2013.01);

(Continued)

(58) Field of Classification Search
None
See application file for complete search history.

(56) References Cited

U.S. PATENT DOCUMENTS

| | | |
|---|---|---|
| 5,718,963 A | 2/1998 | Batzar |
| 7,380,415 B2 | 6/2008 | De Witzmann |

(Continued)

FOREIGN PATENT DOCUMENTS

| | | |
|---|---|---|
| CN | 101415653 | 4/2009 |
| DE | 10163646 A1 | 7/2003 |

(Continued)

OTHER PUBLICATIONS

International Search Report dated Jul. 5, 2013 for corresponding International Patent Application No. PCT/EP2013/058218 with English translation, 6 pages.

(Continued)

*Primary Examiner* — Francisco W Tschen
(74) *Attorney, Agent, or Firm* — Ohlandt, Greeley, Ruggiero & Perle, L.L.P.

(57) ABSTRACT

The invention relates to a method for producing a composite material with a decorative coating, wherein a porous layer that includes pigment particles is applied onto a glass or glass ceramic substrate. The porous layer is filled with a polymer.

22 Claims, 6 Drawing Sheets

(51) Int. Cl.
*C03C 17/32* (2006.01)
*C03C 17/00* (2006.01)
*F24C 15/02* (2006.01)

(52) U.S. Cl.
CPC ....... *F24C 15/10* (2013.01); *Y10T 428/24364* (2015.01)

(56) References Cited

U.S. PATENT DOCUMENTS

| | | |
|---|---|---|
| 2004/0091718 A1 | 5/2004 | Striegler |
| 2005/0129959 A1 | 6/2005 | Roemer-Scheuermann et al. |
| 2008/0233355 A1 | 9/2008 | Henze |
| 2009/0233082 A1* | 9/2009 | Esemann .................. B44C 3/02 428/319.1 |
| 2010/0028629 A1 | 2/2010 | Anton |
| 2010/0167035 A1* | 7/2010 | Striegler ............. C03C 17/3405 428/216 |
| 2010/0219176 A1 | 9/2010 | Striegler |
| 2012/0067865 A1* | 3/2012 | Siebers ............... C03C 10/0045 219/445.1 |
| 2012/0295081 A1* | 11/2012 | Henze ..................... C03C 1/008 428/201 |
| 2013/0115445 A1 | 5/2013 | Devaux |
| 2013/0266781 A1* | 10/2013 | Hoffmann ............... C03C 17/42 428/204 |
| 2015/0191392 A1 | 7/2015 | Henze et al. |

FOREIGN PATENT DOCUMENTS

| | | |
|---|---|---|
| DE | 10355160 | 6/2005 |
| DE | 202004015925 U1 | 11/2005 |
| DE | 102005018246 A1 | 10/2006 |
| DE | 102010004741 | 7/2011 |
| DE | 102010031866 A1 | 1/2012 |
| EP | 1416227 A2 | 5/2004 |
| EP | 1435759 B1 | 7/2004 |
| EP | 2141133 A1 | 1/2010 |
| EP | 2141134 A1 | 1/2010 |
| JP | 2010009958 | 1/2010 |
| JP | 2011216457 | 10/2011 |
| WO | 97027149 A1 | 7/1997 |
| WO | 2006111359 A1 | 10/2006 |
| WO | 2007104752 A1 | 9/2007 |
| WO | 2010/081531 A1 | 7/2010 |
| WO | WO 2011085996 A1 * | 7/2011 ............. C03C 1/008 |
| WO | 2012004337 A1 | 1/2012 |
| WO | WO 2012010302 A1 * | 1/2012 ............. C03C 17/42 |

OTHER PUBLICATIONS

German Office Action dated Jul. 9, 2013 for corresponding German Application No. 10 2012 109 808.5 with English translation, 11 pages.
English translation of the Written Opinion of the International Searching Authority dated Jul. 5, 2013 for corresponding International Patent Application No. PCT/EP2013/058218, 4 pages.
English translation of the International Preliminary Report on Patentability dated Oct. 21, 2014 for corresponding International Patent Application No. PCT/EP2013/058218 with English translation, 5 pages.
Product Information—CI Pigment Black 27—Iron Cobalt Chromite Black Spinel, FERRO Apr. 2004, 1 page.
Web page from www.chemicalbook.com, Iron Cobalt Chromite Black Spinel, Jan. 15, 2018, 1 page.

* cited by examiner

COMPOSITE MATERIAL WITH DECORATIVE COATING AND METHOD FOR PRODUCING SAME

FIELD OF THE INVENTION

The invention relates to a method for producing a composite material with a decorative coating and to such a decorative composite material. More particularly, the invention relates to a glass ceramic substrate such as those used for cooktops, for example, which has a decorative bottom surface coating.

BACKGROUND OF THE INVENTION

Glass or glass ceramic substrates provided with a decorative coating are known. In particular, at least partially transparent glass ceramic substrates such as those used for cooktops are provided with a bottom surface coating.

The decorative coating may be applied for functional reasons, for example to mark hobs. Also, a decorative coating may solely serve to create a special visual impression, for example to provide a hob in a specific color.

For applying decorative coatings, a variety of ways are known from practice.

For example, there exist decorative coatings applied by a sputtering process. Such sputtering processes are complex. Moreover, the options in terms of visual appearance are limited. In case of a partial coating, for example for marking hobs, complex masking steps have to be performed, and sputtered layers often exhibit an undesirably high conductivity, so that often they cannot be arranged behind capacitive switches.

Furthermore, silicone coatings are known. These have the advantage that they may easily be applied using a silicone paint, for example by screen printing, but usually exhibit non-optimal mechanical resistance and tend to discolor under high temperature loads.

Also known are glass flux-based layers, so-called enamel layers. A drawback of such pigmented glass flux-based layers is that they put the glass ceramic substrate under tension thus reducing its strength. This drawback can be alleviated by applying porous layers which however cause a matt appearance of the composite material so produced.

Furthermore, pigmented methyl group functionalized sol-gel coatings are known, which however are prone to cracking which is manifested as local lightening. The risk of cracking may again be reduced by applying porous sol-gel layers, which again is associated with a matt color appearance. In particular it is not possible to provide deep black glossy layers.

Lastly, it is known to apply luster paints. With luster paints, again, color choice is limited, and for producing deep black colors expensive noble metal based paints have to be used.

OBJECT OF THE INVENTION

Therefore, the invention is based on the object to provide a simple method for applying a high-temperature resistant decorative layer with a good visual appearance.

SUMMARY OF THE INVENTION

The object of the invention is already achieved by a method for producing a composite material with a decorative coating and by a composite material having a decorative coating according to any of the independent claims.

Preferred embodiments and modifications of the invention are specified in the dependent claims.

The invention relates to a method for producing a composite material with a decorative coating, a decorative coating also referring to a coating which is at least partially applied for functional reasons, such as marking of cooking hobs, labeling applied, etc.

The coating is applied on a heat-resistant glass or glass ceramic substrate. For cooktops, usually heat-resistant glass ceramic substrates are used. For other application fields with high temperature load, i.e. in particular with a thermal load of more than 200° C., it is also possible to use some heat-resistant special glasses.

The glass or glass ceramic substrate is preferably flat and at least partially transparent in the visible range.

Initially, a sol-gel layer which contains at least pigment particles is applied on the glass ceramic substrate. In particular a hybrid polymer is used for the sol-gel layer, so that once dried a partially inorganic, partially organic layer is formed.

To achieve a high porosity in the nanoscale range, particles are added to the sol-gel.

According to one preferred embodiment of the invention, further fillers may be added as the particles, in particular inorganic skeleton forming material. Preferably, metal or semi-metal oxide particles are used.

The particles preferably have a size from 0.5 to 200 nm, more preferably from 4 to 150 nm. Furthermore, it is also conceivable to add particles having a mean particle size from 10 to 50 nm. These may in particular be produced through the sol-gel precursor.

According to a preferred embodiment of the invention, the coating material comprises particles having a chain-like and/or fibrous morphology.

Particles of a chain-like or fibrous morphology refer to particles having a dimension along their main extension direction which is at least twice, preferably three times of the dimension in the direction of minimal extension of the particle, which in turn applies to the average of the particles used.

Particles of a chain-like morphology are secondary particles consisting of a plurality of aligned small primary particles. It will be understood that the particles may be branched, at least partially.

In particular, nanoparticles having an average length from 50 to 150 nm and an average size from 5 to 25 nm may be used. The size may be determined by means of scanning electron micrographs, as will be described in more detail below.

If the particle size of preferably used chain-like nanoparticles is determined in a 0.05 mass % dispersion using the method of dynamic light scattering (DLS) (device: Delta Nano HC; evaluation according to the method of Conten), the particle size is about 91 nm, with a very broad distribution and a standard deviation of about 70 nm. The diameter of the primary particles of the chain-like particles as measured in the SEM (Scanning Electron Microscope) is about 15 nm.

By contrast, DLS measurements of dispersions without chain-like secondary particles and only consisting of spherical primary particles (diameter of about 15 nm by SEM) exhibit a diameter of 38 nm with a standard deviation of about 14 nm.

In one embodiment, the filler particles comprise non-coloring material, such as silicon oxide, zirconium oxide, or aluminum oxide.

Further, it is also conceivable to add polysiloxane nanoparticles and coloring nanoscale pigments.

If coloring pigment particles and non-coloring skeleton-forming components are used, the mass ratio of the coloring components to the non-coloring components is from 0.02 to 5, preferably from 0.3 to 2, more preferably from 0.6 to 1.2. In one embodiment of the invention, the volume ratio of the coloring skeleton-forming components to the non-coloring skeleton-forming components is from 0.01 to 3.5, preferably from 0.2 to 1.5, and more preferably from 0.4 to 1.0.

In one preferred embodiment of the invention, the density of the skeleton-forming material, in particular of the skeleton-forming material made up of nanoscale particles is between 2.0 and 6 $g/cm^3$, preferably from 3 to 4 $g/cm^3$. The skeletal density may be determined by He pycnometry.

In one embodiment, the skeleton-forming material, that means the material by which the porosity is provided, at least partially comprises oxides that have been formed as decomposition products from molecularly disperse sol-gel precursors.

These may include, for example, decomposition products of alkoxysilanes or alkoxyzirconates (GPTES: glycidyloxypropyltriethoxysilane, TEOS: tetraethoxysilane, MTEOS: methyltriethoxysilane, PhTEOS: phenyltriethoxysilane, MPTES: methacryloxypropyltriethoxysilane, MPTMS: methacryloxypropyltrimethoxysilane, VTES: vinyltriethoxysilane, ATES: allyltriethoxysilane, zirconium tetrapropylate, titanium tetraethylate, aluminum secondary butylate).

Preferably, crystalline and/or glassy inorganic materials are used as the skeleton-forming matrix material.

The sol-gel layer is preferably applied by screen printing.

On the sol-gel layer which is first dried and baked to form a skeleton, a polymer layer is applied, and the sol-gel layer is infiltrated by the material of the polymer layer.

Surprisingly, it has been found that even a sol-gel layer having a mean pore diameter of less than 100 nm, which in particular in nitrogen adsorption porosity measurements appears to be a dense layer, is infiltrated by a polymer material, so that a dense composite layer is formed.

The polymer layer preferably exhibits a heat resistance of more than 200° C., preferably more than 300° C., most preferably more than 400° C. at an exposure time of 1 hour. In particular polysiloxanes, especially silicone paints such as methyl or phenyl silicone resins are used. It is also conceivable to use a different sol-gel material for the polymer layer.

The inventors have found that by combining a partially inorganic layer that is filled with a polymer material, a homogeneous dense layer composite can be provided, which may be highly glossy and which is far less prone to cracking under temperature stress than conventional sol-gel coatings.

Rather, the color location is highly glossy before and after thermal stress, in particular with a gloss level of G1 according to the EN ISO 2813 standard.

Due to its density, the layer composite is not prone to local discoloration, even upon contact with contaminants or their degradation products.

It is particularly easy to provide black layers, in particular with an L value in the Lab color space of less than 28.0, preferably less than 27.5, and more preferably less than 27.0.

In a preferred embodiment of the homogeneous composite material produced according to the invention, the skeletal density of the pigmented polymer layer is from 1.3 to 5 $g/cm^3$, preferably from 1.5 to 4.0 $g/cm^3$, and more preferably from 1.8 to 3.0 $g/cm^3$.

The material of the polymer layer infiltrates the skeleton-forming material of the sol-gel layer nearly homogeneously and in a nanoscale dimension.

In one preferred embodiment, the density of the infiltrating polymer material is from 1.0 to 2.5 $g/cm^3$, preferably from 1.3 to 2.2 $g/cm^3$, and more preferably from 1.5 to 1.9 $g/cm^3$.

As the polymer material, in particular fluorinated polymers and/or polysiloxanes, or sol-gel-derived hybrid polymers are used. In particular methyl- or phenyl-substituted sol-gel materials or polysiloxanes can be used. In one specific embodiment, a high-temperature resistant methylphenylpolysiloxane resin and a silicon oxide containing methylsiloxane resin is used. Also conceivable are epoxy- and/or polyester- and/or methacrylate- and/or phenyl-substituted siloxanes.

In a preferred embodiment of the invention, the volume ratio of the material of the first layer to the material of the polymer layer in the composite material produced is from 10 to 0.5, preferably from 4 to 1, more preferably from 3 to 1.5.

In a further embodiment of the invention, fillers and/or pigments are also added to the material of the polymer layer. Preferably, the fillers and/or pigments have a mean particle size from 100 nm to 2 μm. Pure fillers may exhibit particle sizes between 1 nm and 300 μm.

In particular silica particles, alumina particles, fumed silica, lime-soda, alkali alumosilicate and/or borosilicate glass spheres and/or hollow glass spheres may be used as the fillers.

Pigments that may be used include in particular: platelet- or rod-shaped pigments, coated effect pigments and absorption pigments (cobalt oxides/spinels, cobalt-aluminum spinels, cobalt-titanium spinels, cobalt-chromium spinels, cobalt-nickel-manganese-iron-chromium oxides/spinels, cobalt-nickel-zinc-titanium-aluminum oxides/spinels, iron oxides, iron-chromium oxides, iron-chromium-zinc-titanium oxide, copper-chromium spinels, nickel-chromium-antimony-titanium oxides, titanium oxides, zirconium-silicon-iron oxides/spinels etc.).

In particular when using platelet-shaped pigments in the material of the polymer layer, the particles and fillers of the material of the porous layer may be covered, at least partially.

In a preferred embodiment of the invention, the open porosity of the porous layer after a thermal treatment at 400° C. is more than 10%, preferably more than 20%, most preferably more than 25%. After thermal treatment at 400° C., the layer structure of the non-infiltrated layer has both micro- and mesopores, with a mean pore diameter from 1 to 6 nm.

Here, the mean pore diameter is determined from the adsorption curves according to the BJH method, from $N_2$ sorption.

In this case, the open porosity is determined from scraped layers which have not been infiltrated but have been processed with identical parameters, using the $N_2$ sorption method and He pycnometry. Open porosity is then calculated from the pore volume ($N_2$ sorption) and the skeletal density (He pycnometry).

The composite material produced according to the present invention, which includes a composite layer comprising a predominantly inorganic skeleton with pigment particles, which has nanoscale pores that are filled with a polymer, preferably has a closed porosity of less than 20 vol %, more preferably less than 5 vol %.

Here, the open porosity is determined from scraped composite layers using the $N_2$ sorption method and He pycnometry. Subsequently, the open porosity is calculated from the pore volume and the skeletal density. Open porosity refers to the porosity which is calculated from the pore volume that can be measured via $N_2$ sorption.

In a further embodiment of the invention, the composite layer produced is covered by further layers. In particular pigmented sol-gel layers or polysiloxane layers may be used.

Besides the preferred use as a bottom surface coating for a glass ceramic cooktop, the invention is also suitable for printing glass panes, for example for oven doors and fireplace windows.

DESCRIPTION OF THE DRAWINGS

The invention will now be explained in more detail by way of schematically illustrated exemplary embodiments and with reference to the drawings of FIGS. 1 to 6.

For illustration purposes, FIG. 1 schematically shows a composite material 1 including a composite layer applied according to the invention. A composite layer applied on a glass ceramic substrate 2 consists of a porous layer that has been filled with a polymer layer.

Figure 1:
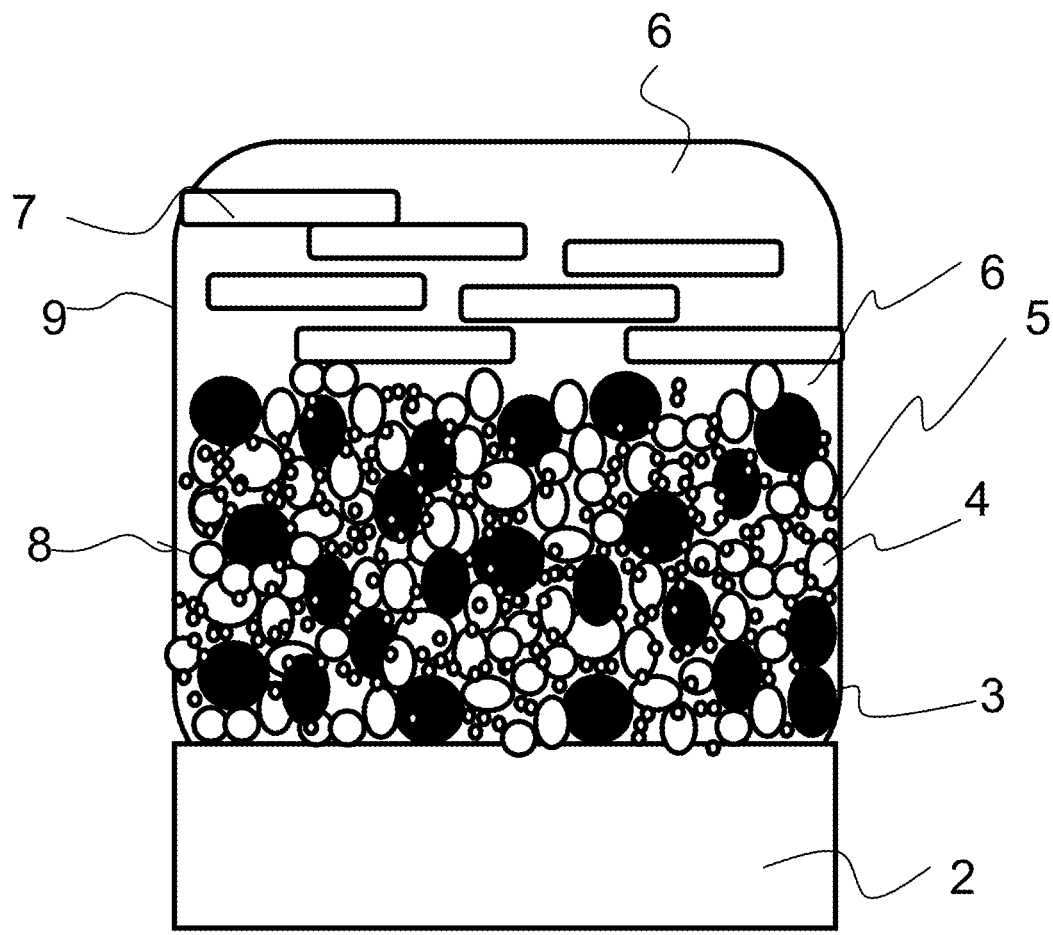

The composite layer comprises coloring pigment particles 3. At the same time, the pigment particles 3 are used to form a porous skeleton. For example a manganese-ferrite spinel having an average particle size of less than 100 nm can be used.

Furthermore, the material of the first layer initially applied as a sol-gel layer comprises non-coloring filler particles, in the present exemplary embodiment filler particles 4 having a mean diameter between 15 and 150 nm. Further particles 5 are likewise non-coloring skeletal particles from a molecular sol-gel precursor, for example silicon oxide having a granular structure with a mean particle size of less than 5 nm from pyrolyzed and previously hydrolyzed hybrid polymers (e.g. GPTES, TEOS).

Particles 3, 4, 5 of the initially applied layer are filled with a polymer material 6, in the present exemplary embodiment with a high-temperature resistant polysiloxane, so that a dense composite material 8 has been formed.

In the exemplary embodiment illustrated, the polymer material 6 was applied in such a large amount that a sealing layer 9 was created above the composite material 8, which does not contain any filler particles 4, 5, nor pigment particles 3 of the material of the first porous layer.

Rather, the polymer material 6 was mixed with comparatively large platelet-shaped pigments which lie upon the particles of the first layer as an additional layer. Thus, a sealing layer 9 has been formed.

Figure 2A:
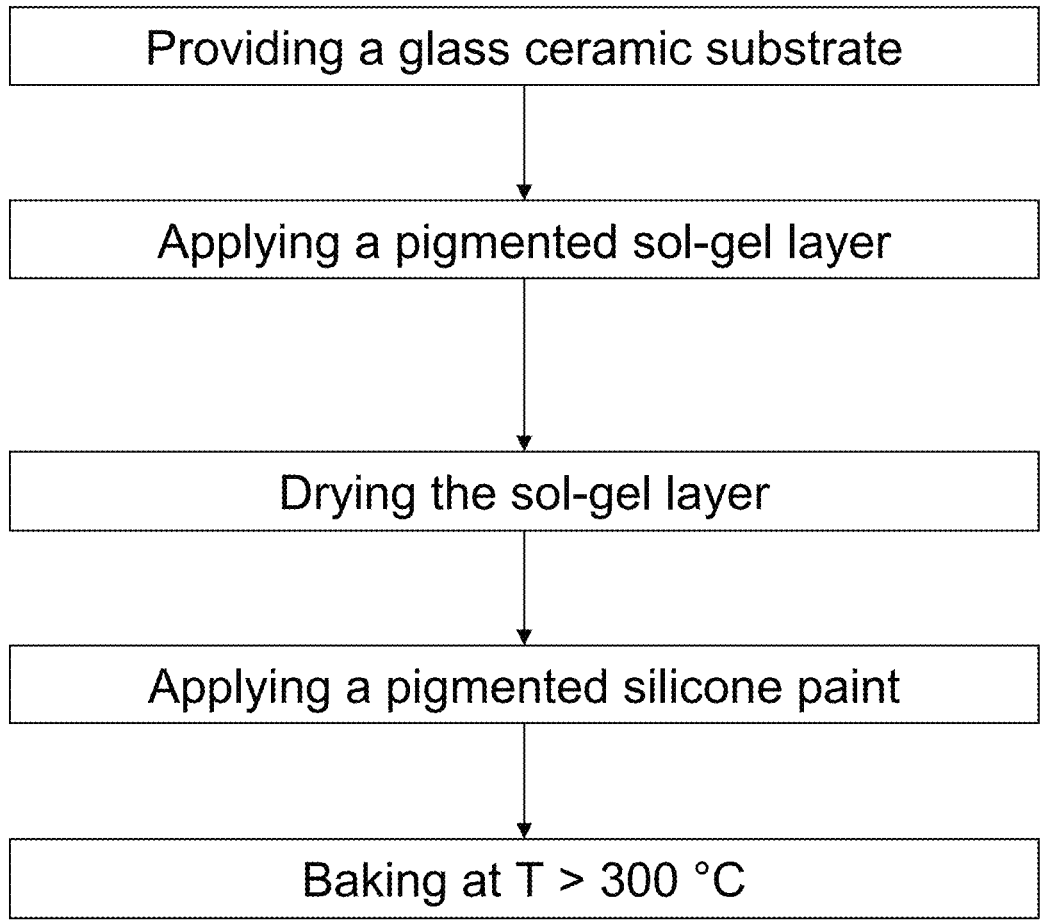
Figure 2B:
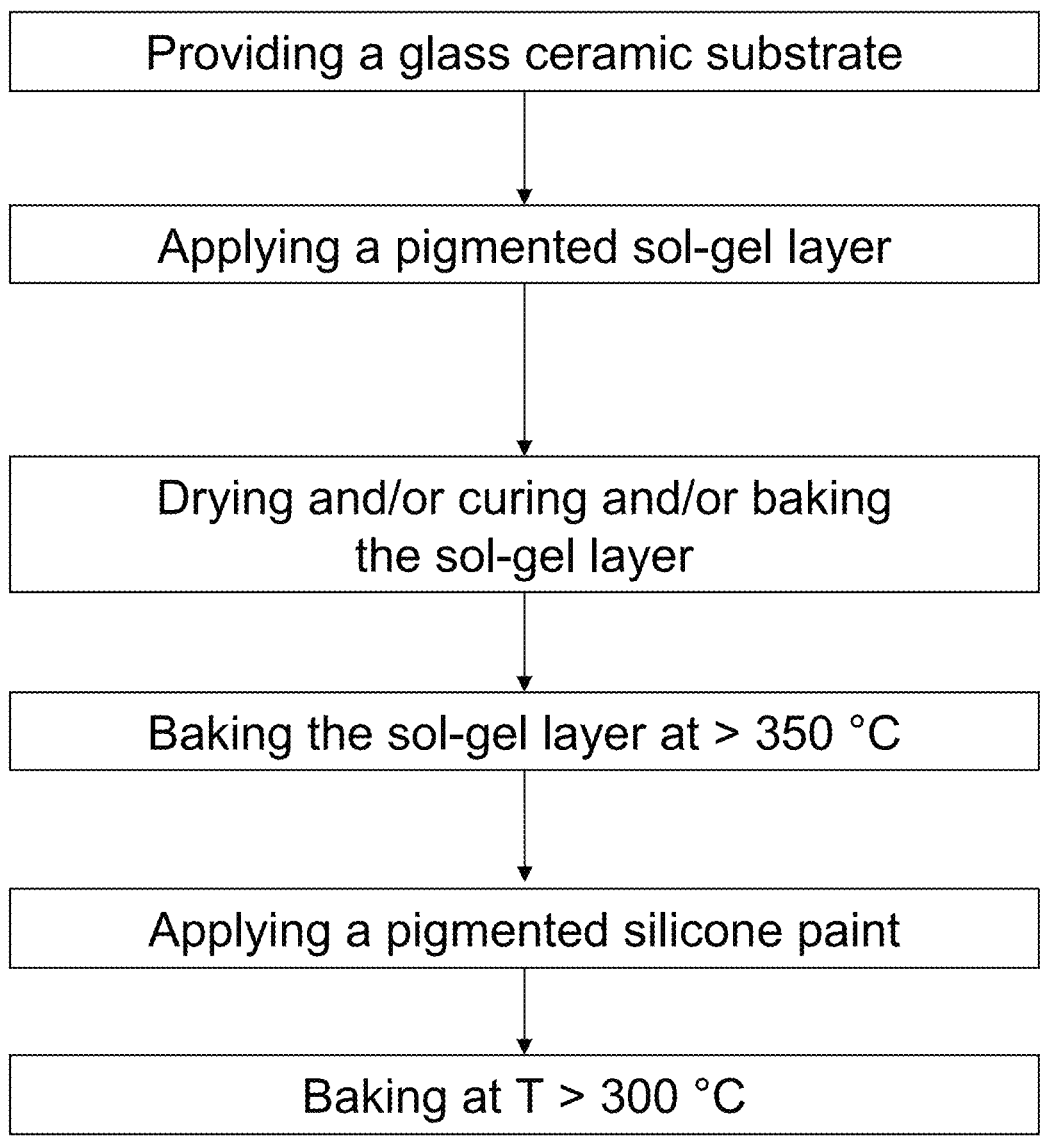

FIG. 2a and FIG. 2b show flow charts which illustrate the essential process steps of one exemplary embodiment of the invention.

First, a glass ceramic substrate is provided.

Then a pigmented sol-gel layer is applied.

The sol-gel layer is dried or cured and is optionally (FIG. 2b) baked at a temperature above 350° C. thereby producing a partially nanoscale porous, partially inorganic skeleton that is infiltrable by the silicone paint.

Then, a pigmented silicone paint is applied, and the layer composite so produced in which the silicone paint fills the nanoscale pores of the sol-gel layer is baked at a temperature of more than 300° C. It will be understood that this may involve removal of organic components, in particular from the sol-gel layer. However, the silicone paint used should exhibit temperature resistance for baking the layer composite.

Figure 3:
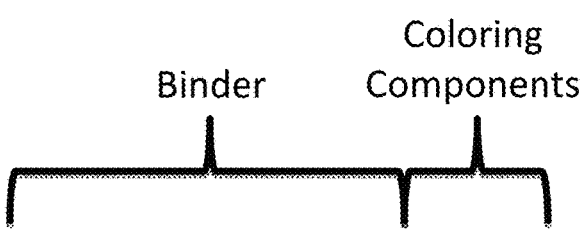

FIG. 3 shows a table with a composition of the sol-gel coating material used, in a simple embodiment and in preferred and more preferred embodiments.

Firstly, the hybrid polymer paint comprises binder components including a sol-gel hydrolyzate and nanoparticles.

As coloring components, inorganic pigments are added.

Furthermore, the hybrid polymer paint comprises a high boiling solvent.

Optionally, initiators, organic crosslinkers and additives may be added in the specified amount.

Figure 4:
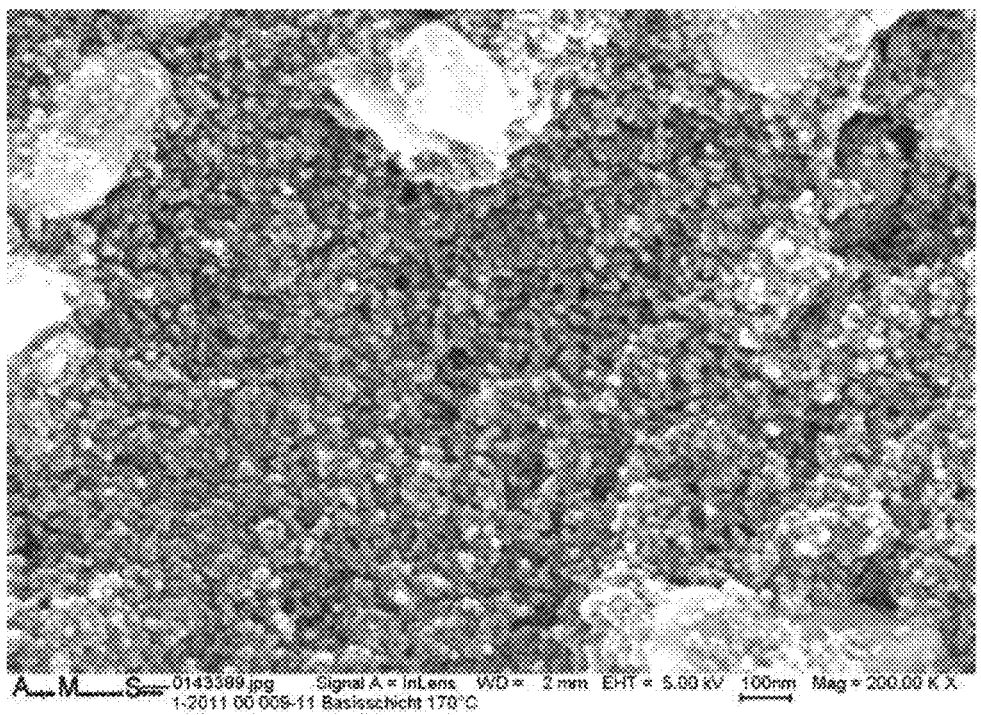

FIG. 4 shows a scanning electron micrograph of an exemplary embodiment of a dried hybrid polymer layer which was applied as the first layer, but has not yet been infiltrated by a polymer.

In particular due to nanoscale particles added, an infiltrable layer has been formed.

Figure 5:
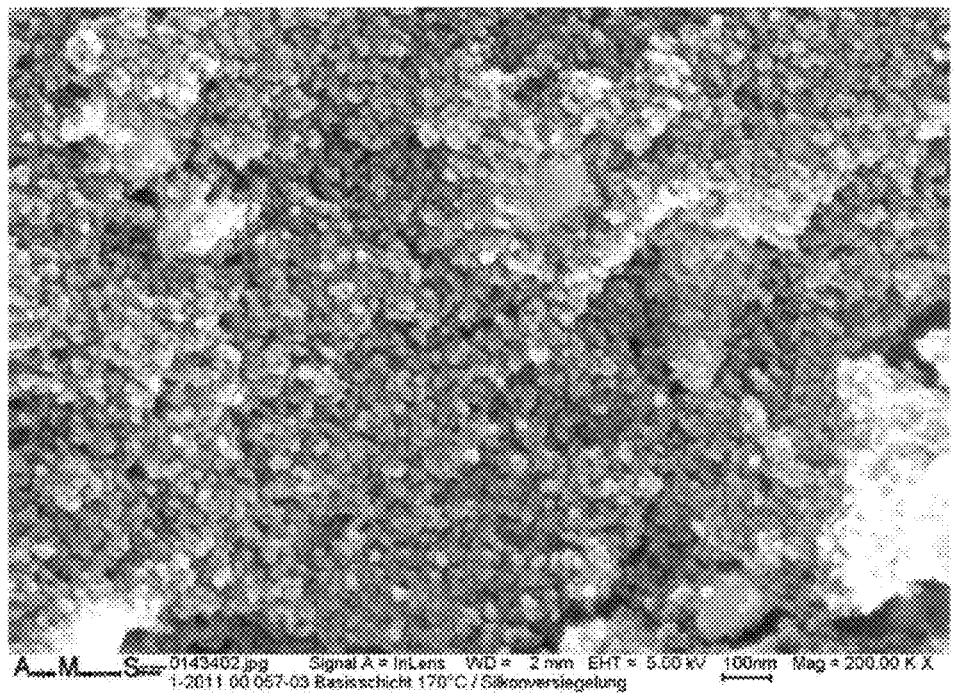

FIG. 5 shows this layer after the application of a polysiloxane. The texture of the first layer is still clearly visible. The first layer has been infiltrated by the polysiloxane, a thick composite layer has been formed.

Figure 6:
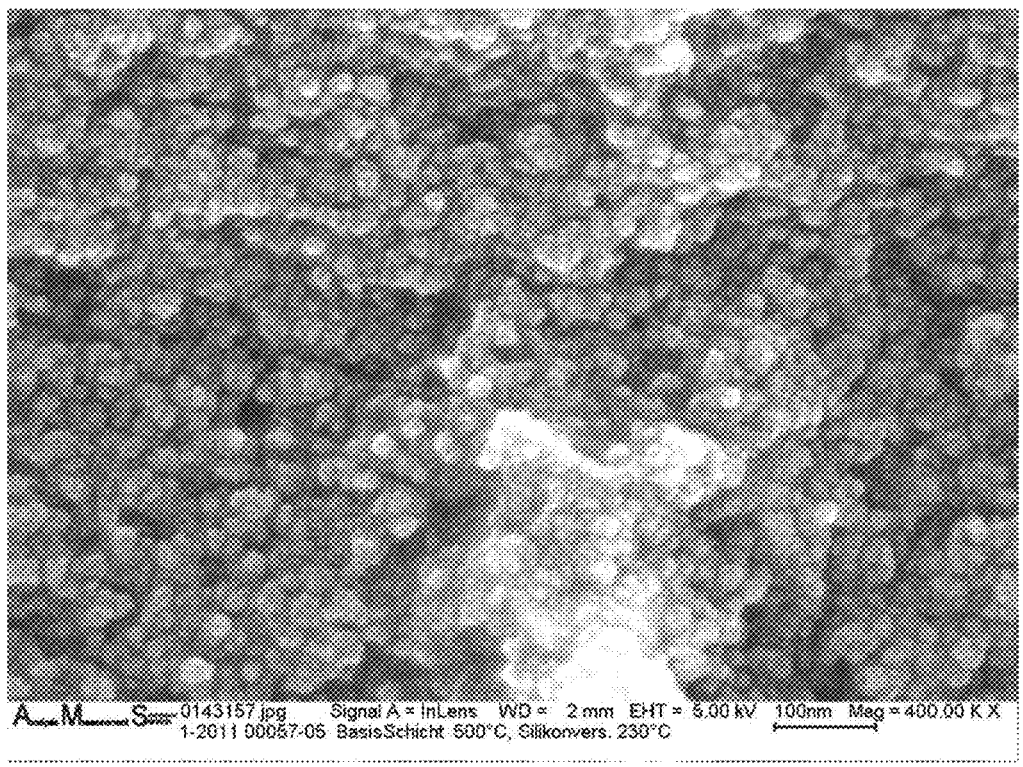

FIG. 6 shows the composite layer of FIG. 5 after having been subjected to a thermal load of more than 500° C. The texture visible in FIG. 5 largely remained intact. Hence, the layer is thermally stable up to above 500° C.

Figure 7:
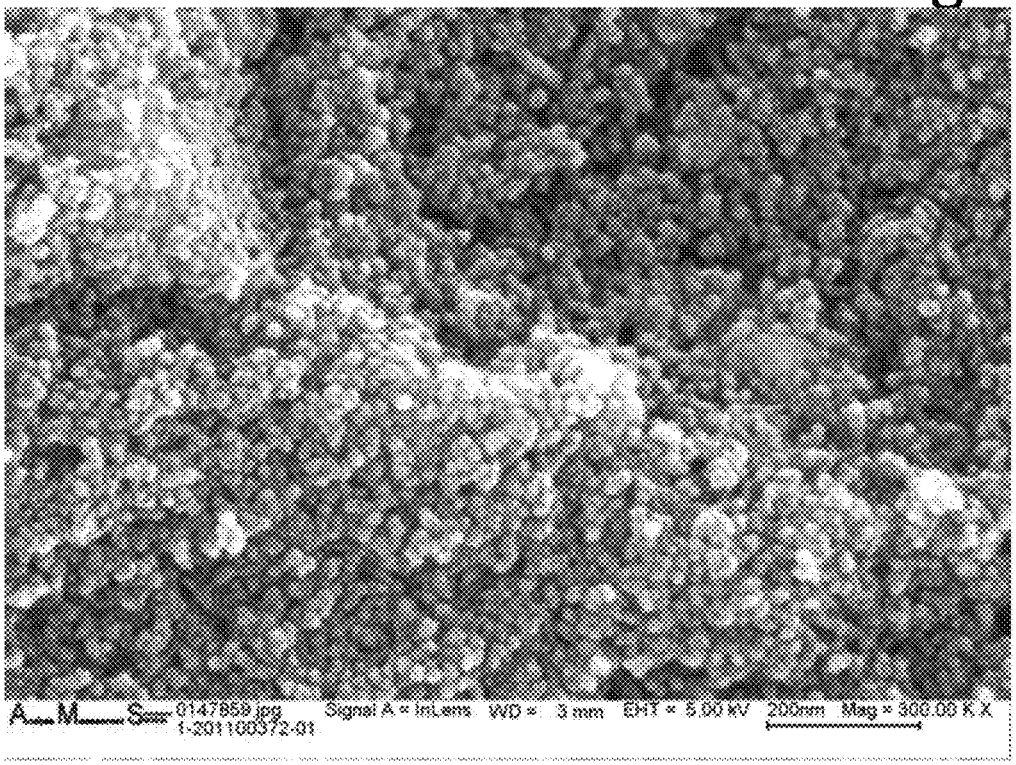

FIG. 7 shows the layer illustrated in FIG. 4 without silicone infiltration after a thermal treatment at 400° C.

A porous layer without infiltrated silicone resin has been formed.

Specifically, a composite material of the invention may be produced as follows:

EXAMPLE 1

First, 4 mol of MPTES (methacryloxypropyltriethoxysilane) is hydrolyzed with 1 mol of TEOS and 2.3 g of $H_2O$ in which 0.344 g of p-toluenesulfonic acid has been dissolved. Subsequently, the solvent is removed from this mixture on a rotary evaporator to obtain the so-called hydrolyzate.

18 g of the hydrolyzate are then mixed with 55 g of a 35 mass % solution of chain-like $SiO_2$ nanoparticles in diethylene glycol monoethyl ether. Subsequently, 30 g of a nanoscale (<100 nm) black pigment (manganese ferrite spinel) is added to this solution.

The paint is homogeneously stirred using a dissolver disk.

The paint is then printed onto a transparent glass ceramic using a 140-mesh screen and thereafter is dried at 170° C. for 1 hour. Thus, the component which later forms a nanoscale skeleton has now been applied.

Then, a second layer with the infiltrating component is applied on the first layer, likewise by screen printing. For this purpose, a silicone paint based on a methyl/phenyl silicone resin diluted in xylene (REN 80 from Wacker) is used. The silicone paint was mixed with 22 mass % of mica-shaped pigments having a mean particle size of 15 µm. A 77 mesh screen is used for the screen printing of the infiltrating component.

Subsequently, the entire layer stack is baked at 380° C. for 1 hour.

In this way, a glass ceramic substrate with a dense homogeneous composite layer covered by a pigmented silicone layer is produced.

EXAMPLE 2

First, 4 mol of GPTES (glycidoxypropyltriethoxysilane) is hydrolyzed with 1 mol of TEOS and 2.3 g of $H_2O$ in which 0.344 g of p-toluenesulfonic acid has been dissolved. Then, the solvent is removed from this mixture on a rotary evaporator to obtain the so-called hydrolysate.

18 g of the hydrolyzate are then mixed with 55 g of a 35 mass % solution of chain-like $SiO_2$ nanoparticles in diethylene glycol monoethyl ether. Subsequently, 30 g of a nanoscale (<100 nm) black pigment (manganese ferrite spinel) is added to this solution.

The paint is homogeneously stirred using a dissolver disk.

The paint is then printed onto a transparent glass ceramic using a 140-mesh screen and thereafter is dried at 170° C. for 1 hour, and the layer is baked at 400° C. Thus, the component which later forms the nanoscale skeleton has now been applied.

Then, a second layer with the infiltrating component is applied on the first layer, likewise by screen printing. For this purpose, a silicone paint is used which is based on a methyl/phenyl silicone resin diluted in xylene (DC 805 from Dow Corning). The silicone paint was mixed with 30 mass % of mica-shaped pigments having a mean particle size of 15 µm. A 77-mesh screen is used for the screen printing of the infiltrating component.

Subsequently, the entire layer stack is baked at 420° C. for 1 hour.

In this way, a glass-ceramic substrate with a dense homogeneous composite layer covered by a pigmented silicone layer is produced.

The invention enabled to provide a method which permits to very easily apply heat-resistant decorative coatings of almost any color location on a glass ceramic substrate.

The invention claimed is:

1. A composite material, comprising a glass ceramic substrate with a composite layer disposed on the glass ceramic substrate, the composite layer having a predominantly inorganic skeleton that has first pigment particles, wherein the composite layer is porous having nanoscale pores filled with a polymer, wherein the polymer is a polysiloxane, wherein the polymer comprises second pigment particles, and wherein the second pigment particles are platelet-shaped and lie upon the composite layer as an additional layer.

2. The composite material as claimed in claim 1, wherein the composite layer has a closed porosity of less than 20%.

3. The composite material as claimed in claim 1, wherein the composite layer has a closed porosity of less than 5%.

4. The composite material as claimed in claim 1, wherein the composite layer has a degree of gloss of G1 according to EN ISO 2813 standard.

5. The composite material as claimed in claim 1, wherein the composite material is suitable for a use selected from the group consisting of a part of a cooktop, a fireplace window, and a part of an oven door.

6. The composite material as claimed in claim 1, wherein the predominantly inorganic skeleton comprises a sol-gel layer.

7. The composite material as claimed in claim 6, wherein the sol-gel layer comprises the first pigment particles and oxide particles.

8. The composite material as claimed in claim 7, wherein the oxide particles are nanoparticles.

9. The composite material as claimed in claim 7, wherein the oxide particles are $SiO_2$ nanoparticles.

10. The composite material as claimed in claim 7, wherein the oxide particles have a fibrous and/or chain-like morphology.

11. The composite material as claimed in claim 1, wherein the nanoscale pores have a mean pore diameter of less than 5 nm.

12. The composite material as claimed in claim 1, wherein the nanoscale pores have a mean pore diameter of less than 10 nm.

13. The composite material as claimed in claim 1, wherein the nanoscale pores have a mean pore diameter between 1 and 200 nm.

14. The composite material as claimed in claim 1, wherein the nanoscale pores have a mean pore diameter between 0.5 and 500 nm.

15. The composite material as claimed in claim 1, wherein the nanoscale pores have a mean pore diameter between 5 and 100 nm.

16. The composite material as claimed in claim 1, wherein the polymer has a density from 1.3 to 2.2 $g/cm^3$.

17. The composite material as claimed in claim 1, wherein the polymer has a density from 1.5 to 1.9 $g/cm^3$.

18. The composite material as claimed in claim 1, further comprising a volume ratio of material of the predominantly inorganic skeleton that has the first pigment particles to material of the polymer in the composite layer is from 10 to 0.5.

19. The composite material as claimed in claim 18, wherein the volume ratio is from 3 to 1.5.

20. A composite material, comprising a glass ceramic substrate with a composite layer disposed on the glass ceramic substrate, the composite layer having a predominantly inorganic skeleton that has first pigment particles and has nanoscale pores and having a polymer layer on the predominantly inorganic skeleton so as to fill in the nanoscale pores, the polymer layer comprising second pigments particles, the polymer layer having a polymer with a density from 1.0 to 2.5 $g/cm^3$, and the composite layer having a closed porosity of less than 20%.

21. A composite material, comprising a glass ceramic substrate with a composite layer disposed on the glass ceramic substrate, the composite layer having a predominantly inorganic skeleton that has pigment particles and has nanoscale pores and having a polysiloxane layer on the predominantly inorganic skeleton so as to fill in the nanoscale pores.

22. A composite material, comprising:
a glass ceramic substrate;
a composite layer disposed on the glass ceramic substrate, the composite layer having a predominantly inorganic skeleton that has first pigment particles, wherein the composite layer has nanoscale pores; and
a sealing layer comprising a polymer and platelet-shaped second pigment particles, the polymer filling the nanoscale pores and extending above the composite layer such that a portion of the sealing layer above the composite layer does not contain any of the first pigment particles, the second pigment particles being in the portion and lying upon the composite layer.

* * * * *